United States Patent [19]
Phillipps

[11] Patent Number: 6,107,988
[45] Date of Patent: Aug. 22, 2000

[54] PORTABLE ELECTRONIC APPARATUS

[76] Inventor: John Quentin Phillipps, 30 Mount Avenue, London W5 2QJ, United Kingdom

[21] Appl. No.: 08/869,581

[22] Filed: Jun. 5, 1997

[30] Foreign Application Priority Data

Jun. 12, 1996 [GB] United Kingdom ............ 9612262

[51] Int. Cl.[7] .................................. G09G 5/00
[52] U.S. Cl. ................. 345/156; 345/158; 345/159
[58] Field of Search ............................ 345/158, 159, 345/121, 156; 361/581; 313/498; 395/500; 400/489

[56] References Cited

U.S. PATENT DOCUMENTS

| | | | |
|---|---|---|---|
| 4,445,011 | 4/1984 | Hansen | 200/50 R |
| 4,855,725 | 8/1989 | Fernandez | 345/173 |
| 4,913,573 | 4/1990 | Retter | 400/489 |
| 5,311,210 | 5/1994 | O'Brien et al. | 345/168 |
| 5,410,333 | 4/1995 | Conway | 345/169 |
| 5,428,355 | 6/1995 | Jondrow et al. | 341/20 |
| 5,467,102 | 11/1995 | Kuno et al. | 345/1 |
| 5,534,888 | 7/1996 | Lebby et al. | 345/121 |
| 5,585,789 | 12/1996 | Haneda | 340/825.52 |
| 5,761,485 | 6/1998 | Munyan | 395/500 |
| 5,768,096 | 6/1998 | Williams et al. | 361/681 |
| 5,821,688 | 10/1998 | Shanks et al. | 313/498 |

*Primary Examiner*—Tan Nguyen
*Assistant Examiner*—Marthe Marc-Coleman
*Attorney, Agent, or Firm*—John P McMahon

[57] ABSTRACT

A portable electronic apparatus has user input means (7,8), for example a keyboard, disposed in back-to-back relation to a display (25,26). The apparatus may be hinged such that it can be opened and closed in the manner of a book, in which case the display may be in two parts that can be brought together when the apparatus is open or flexible so that it can fold on itself when the apparatus is closed.

13 Claims, 10 Drawing Sheets

PORTABLE ELECTRONIC APPARATUS

FIELD OF THE INVENTION

The present invention relates to a portable electronic apparatus having a display and user input means.

BACKGROUND OF THE INVENTION

Known portable or "lap top" computers and personal organizer generally comprise two portions hinged together so that the apparatus can be opened and closed in the manner of a book. A keyboard and a display are located on the inside faces of respective portions.

This arrangement has the disadvantage that the apparatus must be large to accommodate both the display and the keyboard in the same plane when in use.

It is an aim of the present invention to overcome this problem.

SUMMARY OF THE INVENTION

According to the present invention, there is provided a portable electronic apparatus having a substantially planar body portion, a display and a user input means disposed back-to-back on opposite sides of body portion, the user input means comprising a plurality of manually operable elements arranged in at least one row, each row being on a respective curve that, when the apparatus is oriented for normal use, encloses a corner region of the body. Consequently, the apparatus need only be big enough to accommodate the larger of the display and the user input means. The curve on which the manually operable elements is arranged for enabling the manually operable elements to be reached without repositioning of a user's hand.

A portable electronic apparatus according to the present invention may be a computer. However, the present invention is more generally applicable to apparatus including processing means, such as a microprocessor. For instance, the present invention may be applied to mobile telephone apparatus or combined mobile telephone and computer apparatus.

Preferably, an apparatus according to the present invention comprises first and second body portions hinged together such that the apparatus can be opened and closed in the manner of a book, the display panel being located at the inside face of one of said portions and the user input means being located at an outside face of one of said portions. Conveniently, the user input means may be distributed between the body portion.

Preferably, the display panel extends over both portions. This may be achieved by employing a flexible display device or by constructing the panel in two parts which can move into abutment when the device is opened.

In an alternative embodiment, a display panel is located on the inside face of each said portion. Such an arrangement is particularly suited to use in an electronic book apparatus. Such an apparatus advantageously includes means for reading from a data carrier, e.g. a CD-ROM. The text of the "book" can then be displayed as two facing pages in the manner of a conventional paper book.

Preferably, the or each display panel comprises a light emitting polymer display device.

The user input means may comprise a keyboard means. Conveniently, the keyboard means will comprise a membrane keyboard. However, other keyboard structures may be used as appropriate. For instance, a chord keyboard may be provided.

According to the present invention, there is also provided a portable electronic apparatus comprising first and second body portions and a hinge joining the first and second body portions together such that the apparatus can be opened and closed in the manner of a book, and a display panel, the display panel being configured to extend over the inside faces of said portions and across the hinge when the device is open.

According to the present invention, there is further provided a manually operable input device comprising a plurality of tilt switches, wherein a plurality of different characters are represented by the making of respective contacts of said switches.

DESCRIPTION OF THE PREFERRED EMBODIMENTS

Embodiments of the present invention will now be described, by way of example, with reference to the accompanying drawings.

Referring to FIGS. 1 to 4, a first embodiment of the present invention comprises first and second body portions 1, 2. The body portions 1, 2 are rectangular in both plan and section and are coupled by a hinge 3 such that the apparatus may be opened and closed in the manner of a book. First and second co-operating catch elements 4a, 4b are located on respective body portions 1, 2, midway along the faces remote from the hinge 3. The catch elements 4a, 4b cooperate to hold the apparatus in its closed configuration.

Figure 1:
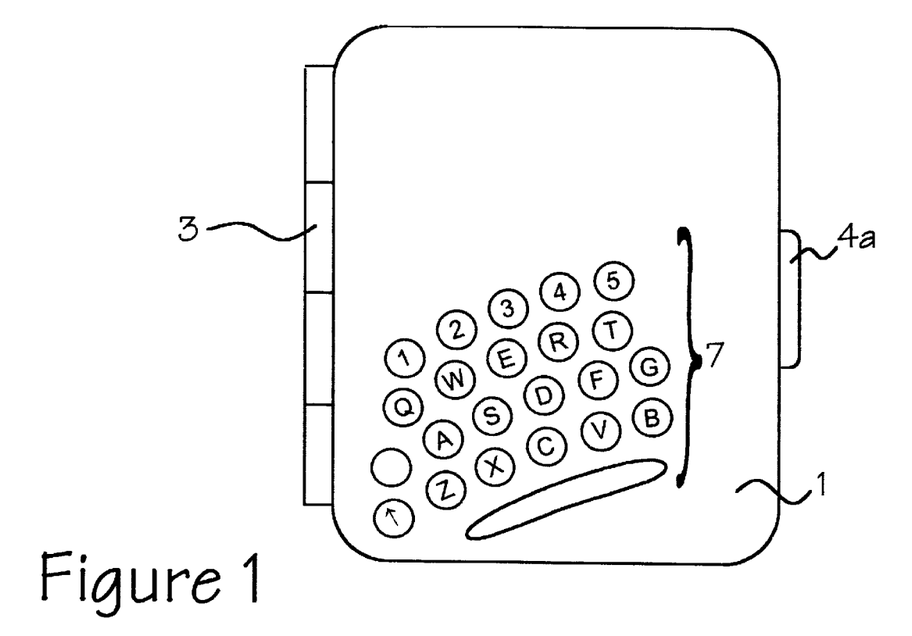
FIG. 1 is a first side view of a first embodiment of the present invention in its closed configuration.
Figure 2:
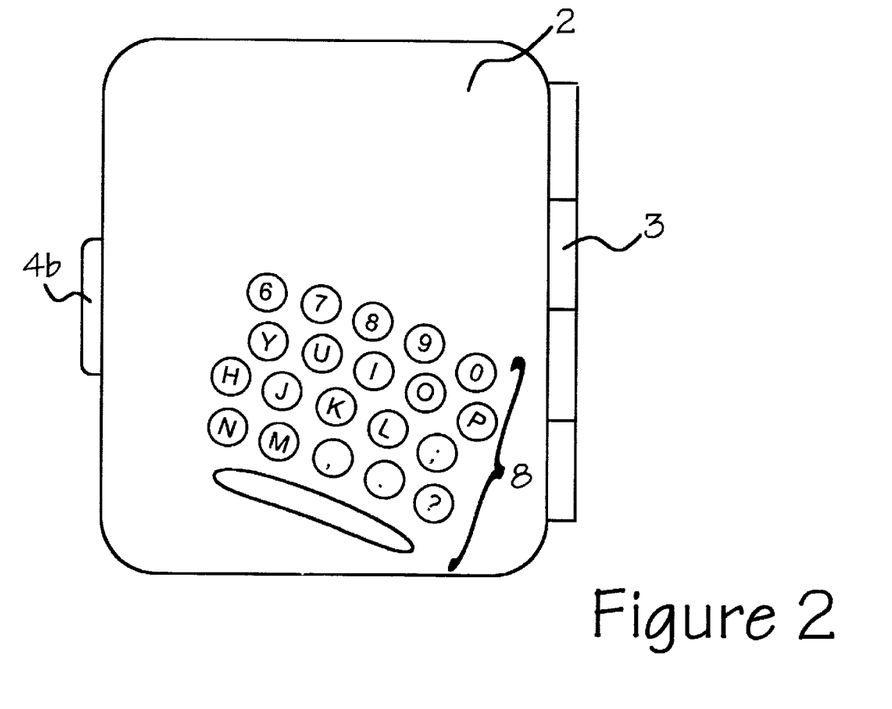
FIG. 2 is a second side view of the apparatus of FIG. 1.
Figure 3:
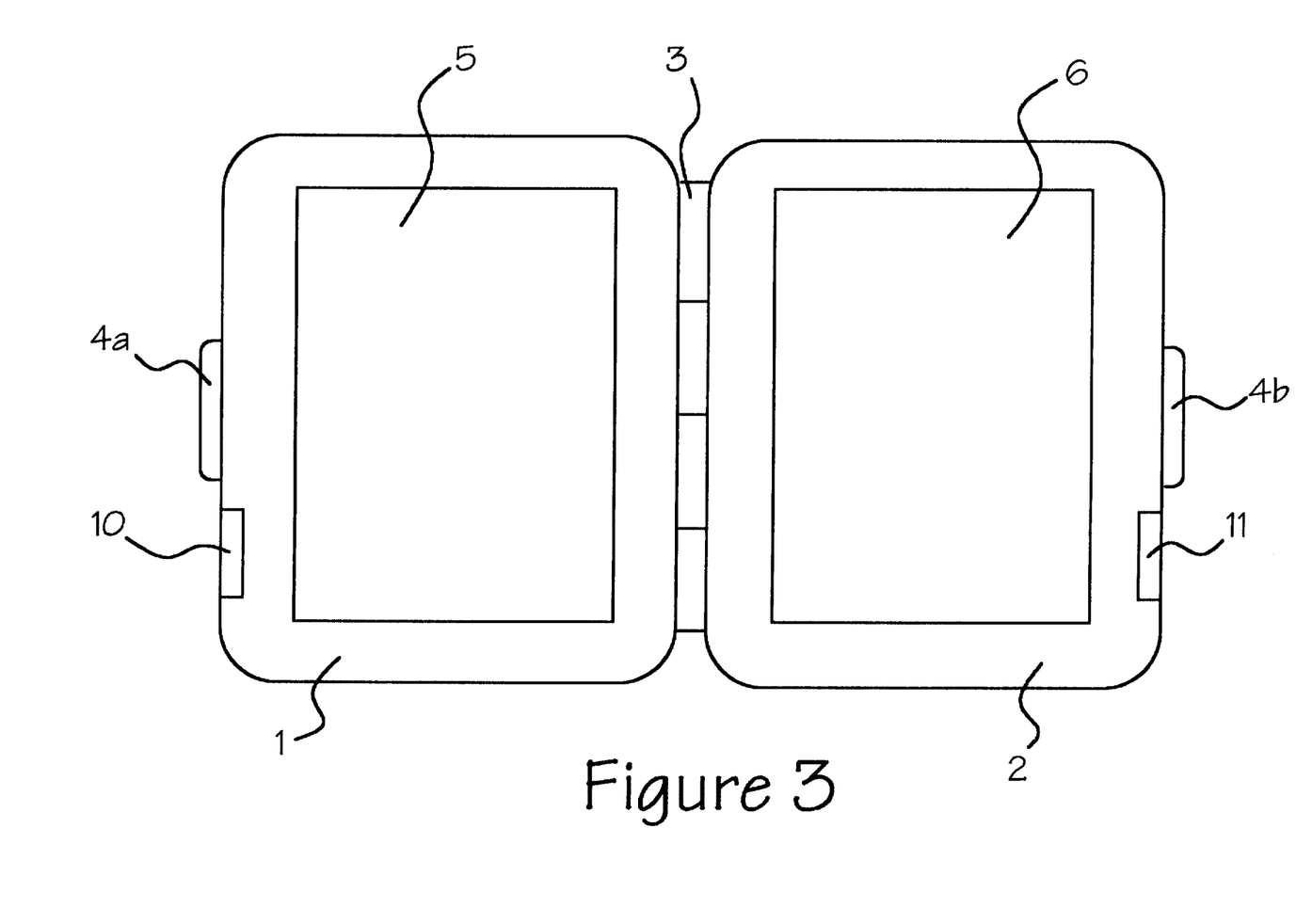
FIG. 3 shows the inside faces of the apparatus of FIG. 1 in its open configuration.
Figure 4:
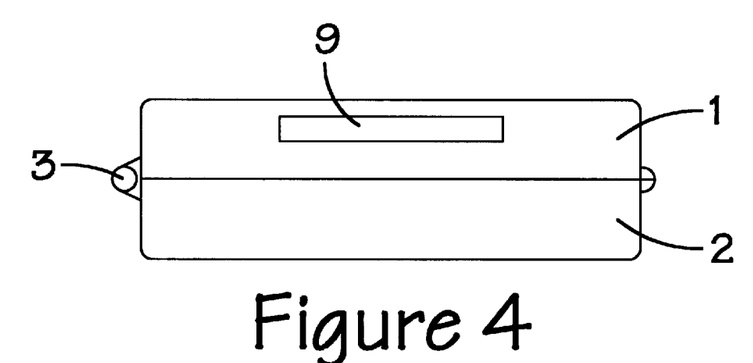
FIG. 4 is a top view of the apparatus of FIG. 1.

A first LCD panel 5 is located at the inside face of the first body portion 1 and a second LCD panel 6 is similarly located at the second body portion 2. The keys 7, 8 of a keyboard are distributed between the outside faces of the body portions 1, 2. The keys 7,8 are of the membrane type and are arranged in rows on curves enclosing lower corner regions (as viewed in FIGS. 1 and 2) of the first and second body portions 1, 2. The keys 7, 8 are supplemented by additional keys 10, 11 in the margins of the inside faces of respective body portions 1, 2, positioned to be operated conveniently by a user's thumbs. The additional keys 10, 11 provide the "ENTER" function for the keyboard.

The first body portion 1 houses microcomputer circuitry and a CD-ROM drive. A slot 9 is provided in the upper face of the first body portion 1 to provide access to the CD-ROM drive for the insertion and removal of CD-ROMs. A battery pack is housed in the second body portion 2.

The microcomputer circuitry is substantially standard and such as one would find in a "palm top" computer. However, its display interface is modified to control the two LCD panels 5,6.

The microcomputer circuitry is programmed with useful programs, such as a diary program, a calculator program, a communications program (should the apparatus include a modem or means to couple it to a modem) and a word processor. However, this embodiment is particularly suited for use as an electronic book. For this use, the microcomputer circuitry is programmed to read text and graphics data from a CD-ROM and display them on the LCD panels 5, 6 in the manner of the facing pages of a book. The microcomputer circuitry is further programmed to respond to operation of the further keys 10, 11 to cause the displayed "pages" to change in the manner of the pages of a book being turned.

Referring to FIGS. 5 to 8, a second embodiment of the present invention comprises first and second body portions 1, 2. The body portions 1, 2 are rectangular in both plan and section and are coupled by a hinge 13 such that the apparatus may be opened and closed in the manner of a book. First and second co-operating catch elements 14a, 14b are located on respective body portions 1, 2, midway along the faces remote from the hinge 13. The catch elements 14a, 14b co-operate to hold the apparatus in its closed configuration.

Figure 5:
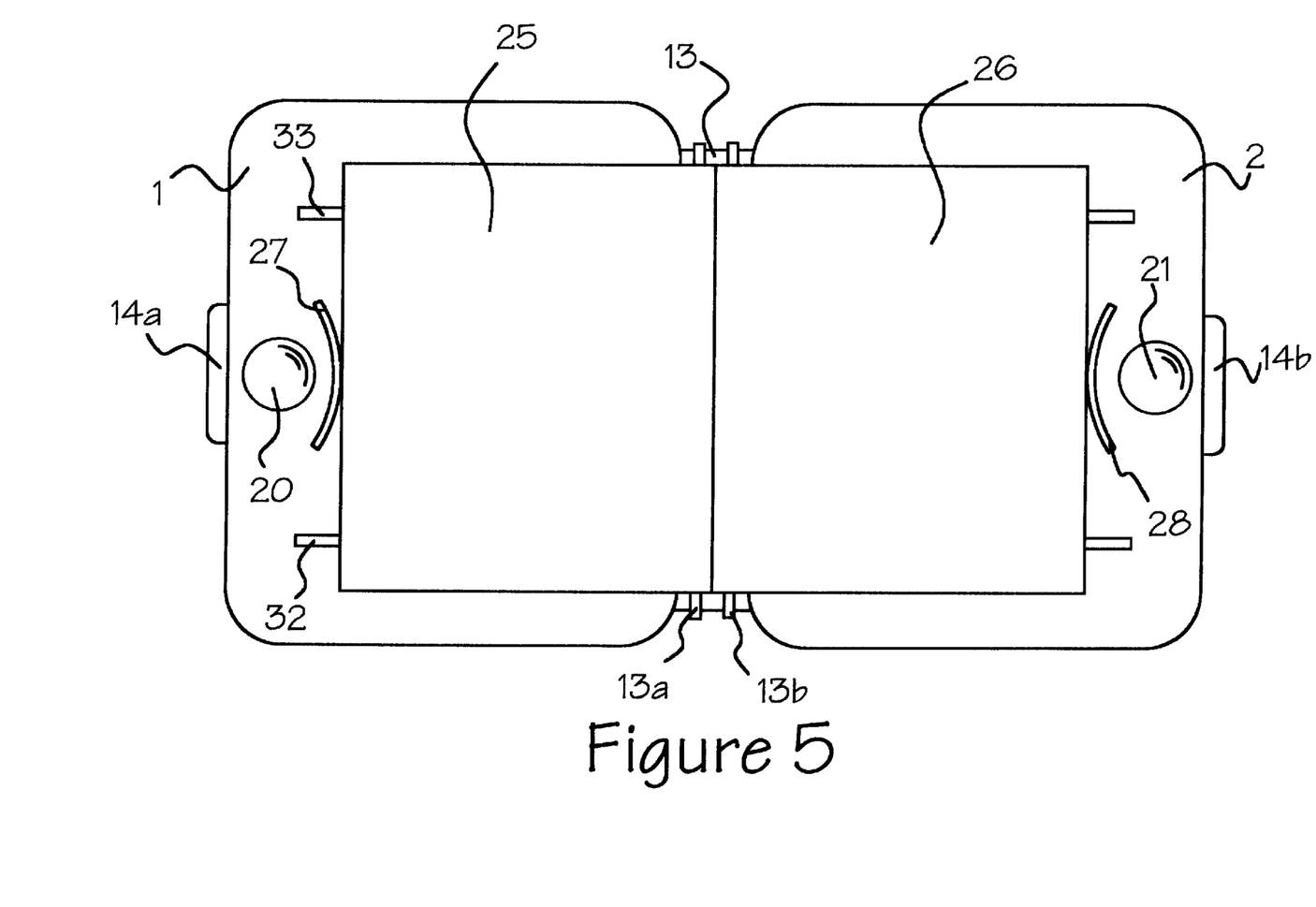
FIG. 5 shows the inside faces of a second embodiment of the present invention.
Figure 6:
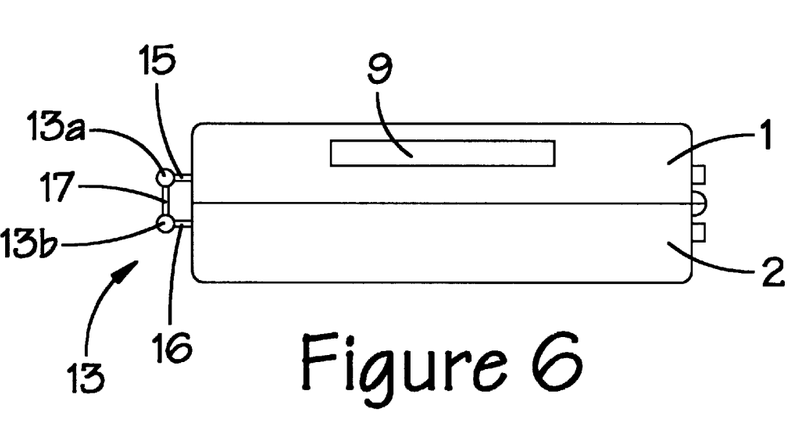
FIG. 6 is a top view of the apparatus of FIG. 5.

The hinge 13 must not project above the inside faces of the body portions 1, 2 when the apparatus is in its open configuration. To achieve this, the hinge 13 comprises first and second parallel, elongate pivots 13a, 13b. The first pivot 13a is coupled to the spine face of the first body portion 1 by a first strip-like element 15. The second pivot 13b is similarly coupled to the second body portion 2 by a second strip-like element 16. A third strip-like element 17 couples the pivots 13a, 13b to each other. When the apparatus is in its closed configuration, the first and second strip-like elements 15, 16 are at right angles to the third strip-like element 17. However, when the apparatus is in its open condition the strip-like elements 15, 16, 17 all lie in the same plane.

A keyboard, as described above, is distributed between the outside faces of the body portions 1, 2. The additional keys 10, 11 of the first embodiment are replaced by first and second track balls 20, 21 located in the margins of the inside faces of respective body portions 1, 2, adjacent the catch elements 14a, 14b.

A display comprises first and second light emitting polymer display panels 25, 26. The display panels 25, 26 are slidingly mounted to the inside faces of respective body portions 1, 2. When the apparatus is in its closed configurations, the display panels 25, 26 are retracted away from the hinge 13. Once the apparatus has been opened flat, the display panels 25, 26 are pushed by a user, using tabs 27, 28 on the edges of the panels 25, 26 remote from the hinge 13, toward the hinge 13 such that they abut each other.

Figure 7:
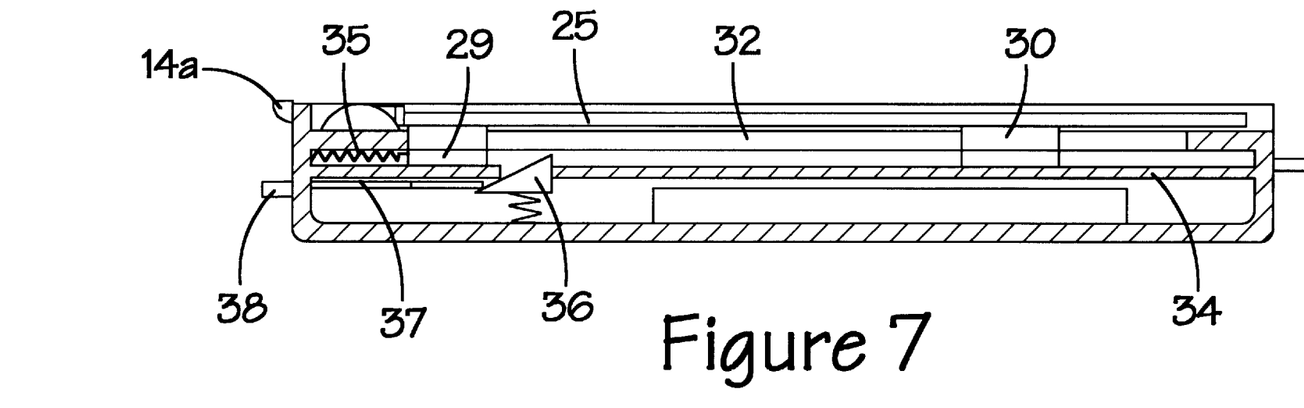
FIG. 7 is a sectional view of one half of the apparatus of FIG. 5 with the display panel portion retracted.
Figure 8:
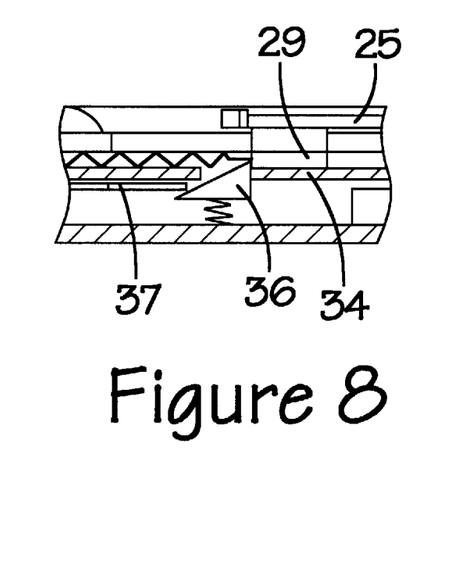
FIG. 8 is a detailed view of the region circled in FIG. 7 but with the display panel portion extended.

Referring particularly to FIGS. 7 and 8, the first display panel 25 is provided with first and second pairs of T-section lugs. The first pair of lugs 29 is located toward the outer edge of the panel 25 and the second pair 30 is located toward the inner edge of the panel 25. One lug 29, 30 of each pair is received in one of a pair of slots 32, 33. A panel 34 is located beneath and in contact with the lugs 29, 30. Each of the first pair of lugs 29 is coupled to the wall of the body portion 1, remoted from the hinge 13, by a spring 35. The springs 35 are arranged to be placed under tension when the panel 25 is moved toward the hinge 13. The panel 25 is held in its advanced position by a pair of spring-loaded detents 36 which engage respective lugs 29 of the first pair of lugs. A forked slider 37 engages each of the detents 36 and projects from the body portion 1, adjacent the catch element 14a, to provide a release button 38. When the release 38 button is pressed, the slider 37 bears against the detents 36 in a camming action causing them to be depressed against their spring loading. Once the detents 36 have been depressed until they no longer project above the panel 34, the panel 25 is free to be retracted by the springs 35 as they relax.

A similar mechanism is provided in the second body portion 2 for the second display portion 26.

Microcomputer circuitry and a battery pack are located in the body portions 1, 2. A slot 9 is provided in the upper face of the first body portion 1 for receiving ROM cartridges. The microcomputer circuitry is programmed with programs such as are conventionally found in electronic personal organizers, such as the Psion Organizer. Of course, the display interface will differ because it needs to drive separate display panels. However, it is known to display a signal image across two or more screens and the skilled person will not have difficulty adapting the known systems to an apparatus according to the present invention.

Light emitting polymer (LEP) panels used for the display panels 25, 26 are such as have been developed and patented by Cambridge Display Technology Limited of 181a Huntingdon Road, Cambridge CB3 ODJ. LCD panels require spacers at their peripheries to keep their glass sheets apart and to retain the liquid crystal material. LEP panels do not require this space and pixels can be located very close to the edges of these panels. Thus, disruption of the displayed image, where the display panels 25, 26 meet, can be minimized.

Referring to FIGS. 9 to 13, a third embodiment of the present invention comprises first and second moulded plastic body portions 31, 32. The body portions 31, 32 are rectangular in plan and slightly domed in section and are coupled by a plastic strap hinge 33 such that the apparatus may be opened and closed in the manner of a book. A fastening for holding the apparatus in its closed configuration comprises a tab 34 attached to the first body portion 31. The tab 31 and the second body portion 32 are provided with co-operating Velcro patches. The apparatus is about the size as a wallet.

Figure 9:
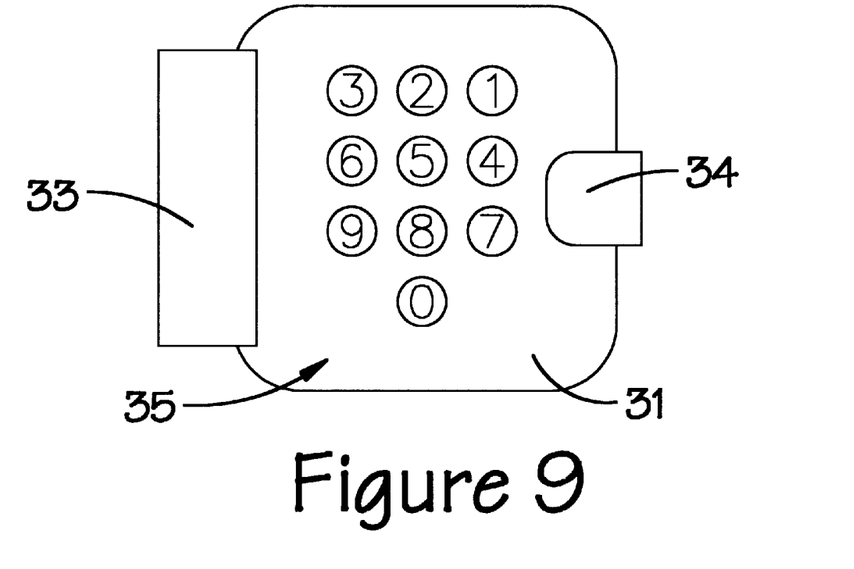
FIG. 9 is a first side view of a third embodiment of the present invention in its closed configuration.
Figure 10:
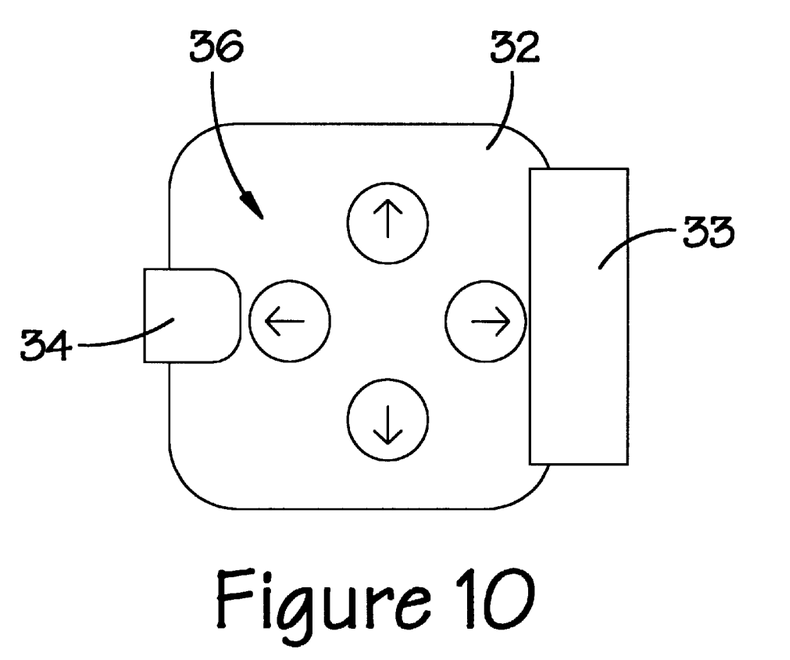
FIG. 10 is a second side view of the apparatus of FIG. 9.
Figures 12, 13:
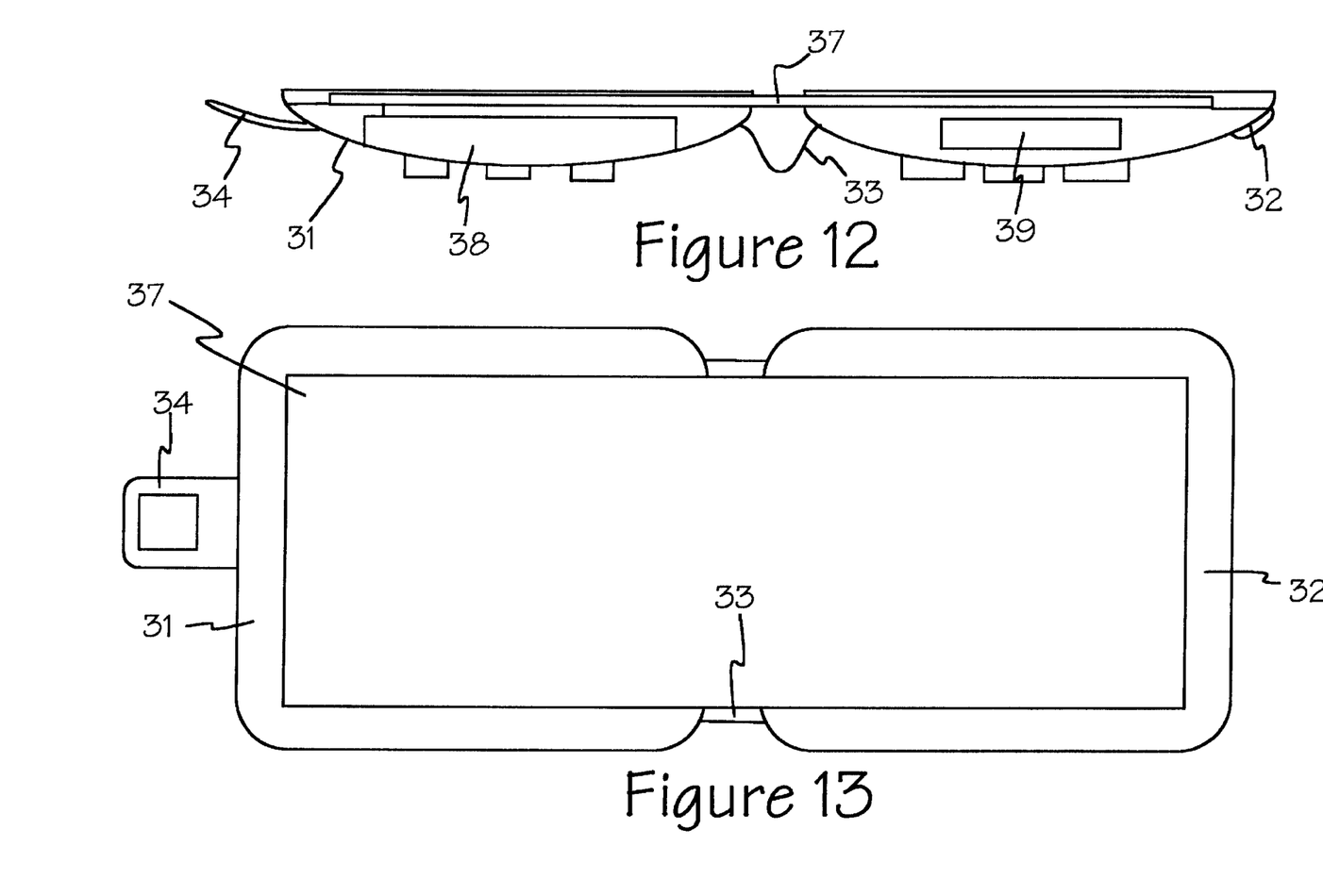
FIG. 12 is a bottom view of the apparatus of FIG. 9 in its open configuration.
FIG. 13 shows the inside faces of the apparatus of FIG. 9.

A first membrane keypad 35 is located at the outside face of the first body portion 31 and a second membrane keypad 36 is located on the outside face of the second body portion 32.

A flexible display panel 37 is mounted to the inside faces of the body portions 31, 32. The display panel 37 comprises a light emitting polymer structure formed on a flexible plastics substrate.

Figure 11:
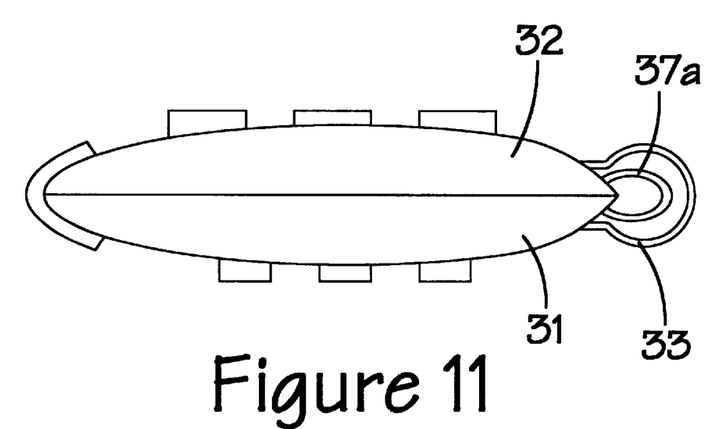
FIG. 11 is a top view of the apparatus of FIG. 9 in its closed configuration.

The strap hinge 33 forms a stiff loop when the apparatus is in its closed configuration. This provides space for the display panel 37 also to form a loop 37a (not shown) when the apparatus is in its closed configuration. Consequently, creases in the display panel 37 are avoided. The resolution required of the display panel 37 will depend on the use of the apparatus and if the apparatus is merely a calculator, a low resolution display would be acceptable.

Microcomputer circuitry 38 and a battery pack 39 are located in respective body portions 31, 32.

Figure 14:
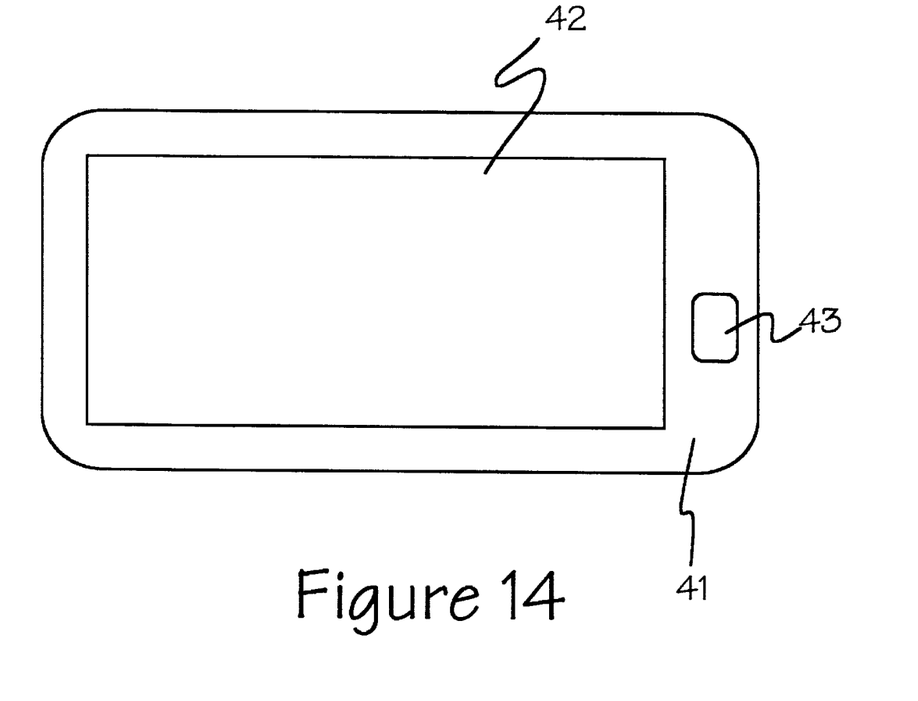
FIG. 14 is a front view of a fourth embodiment of the present invention.
Figure 15:
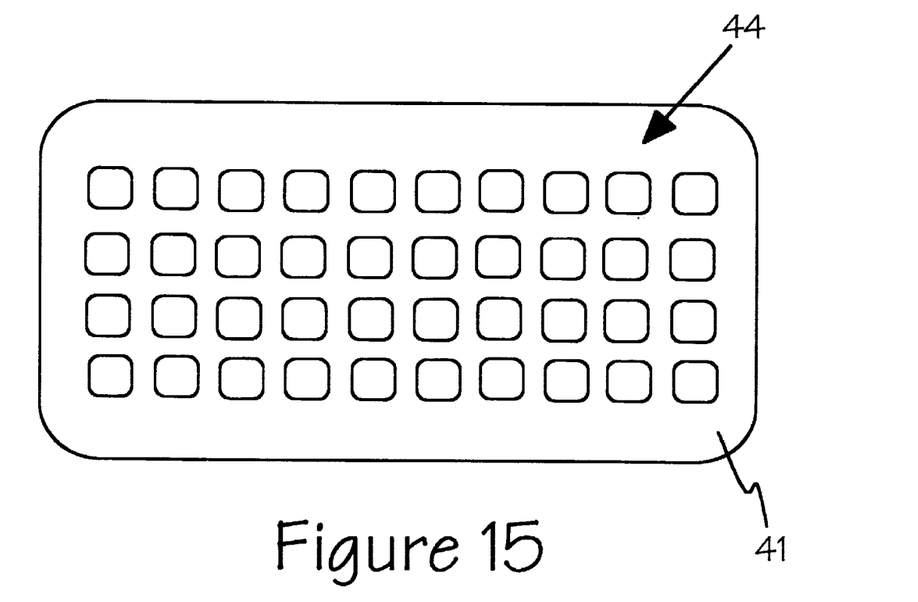
FIG. 15 is a back view of the apparatus of FIG. 14.

Referring to FIGS. 14 and 15, a fourth embodiment of the present invention comprises a body 41, an LCD panel 42 mounted to the front face of the body, an ENTER key 43 beside the LCD panel 42 and a keyboard 44 located at the rear face of the body 41. The body 41 contains electronic circuitry for providing "personal organizer" functions.

Figure 16:
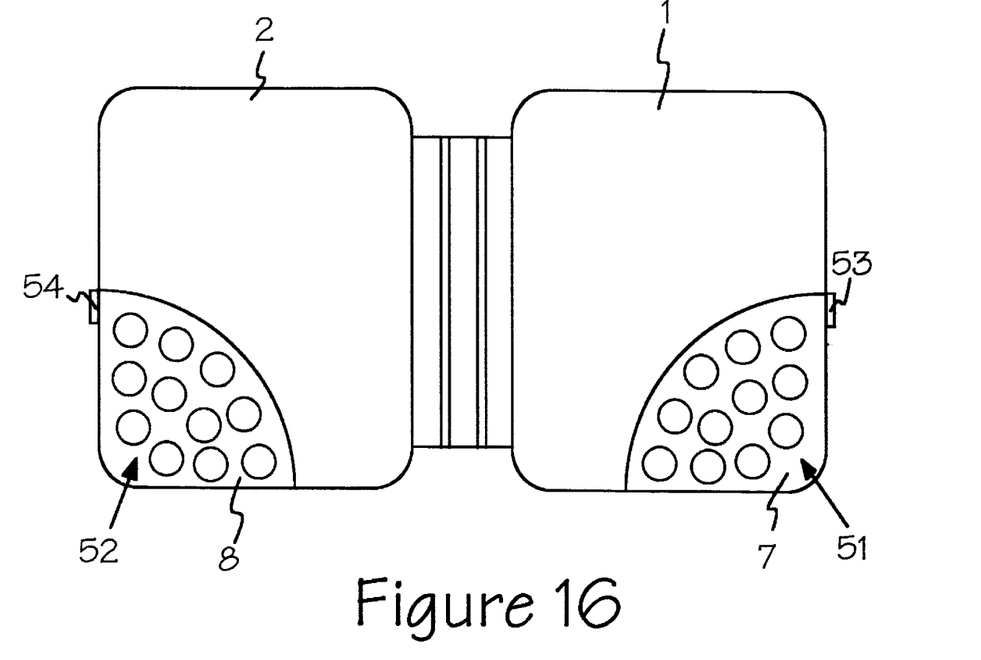
FIG. 16 is a back view of a fifth embodiment of the present invention in its open configuration.
Figure 17:
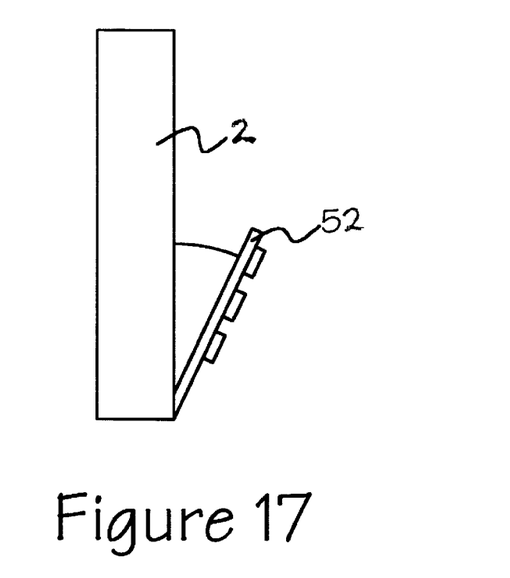
FIG. 17 is a side view of the apparatus of FIG. 16.

Referring to FIGS. 16 and 17, a fifth embodiment of the present invention is identical to the second embodiment, described above, except for the keyboard arrangement. The keyboard comprises first and second groups of keys 7,8 on respective body portions 1,2. The keys 7,8 are arranged in rows on curves around lower corner regions (as viewed in FIG. 16) of the first and second body portions 1,2. The groups of keys 7,8 are located in respective hinged panels 51,52. The hinged panels 51,52 are provided with tabs 53,54 which can be used to tilt the panels 51,52 away from the body portions 1,2 for use.

Figure 18:
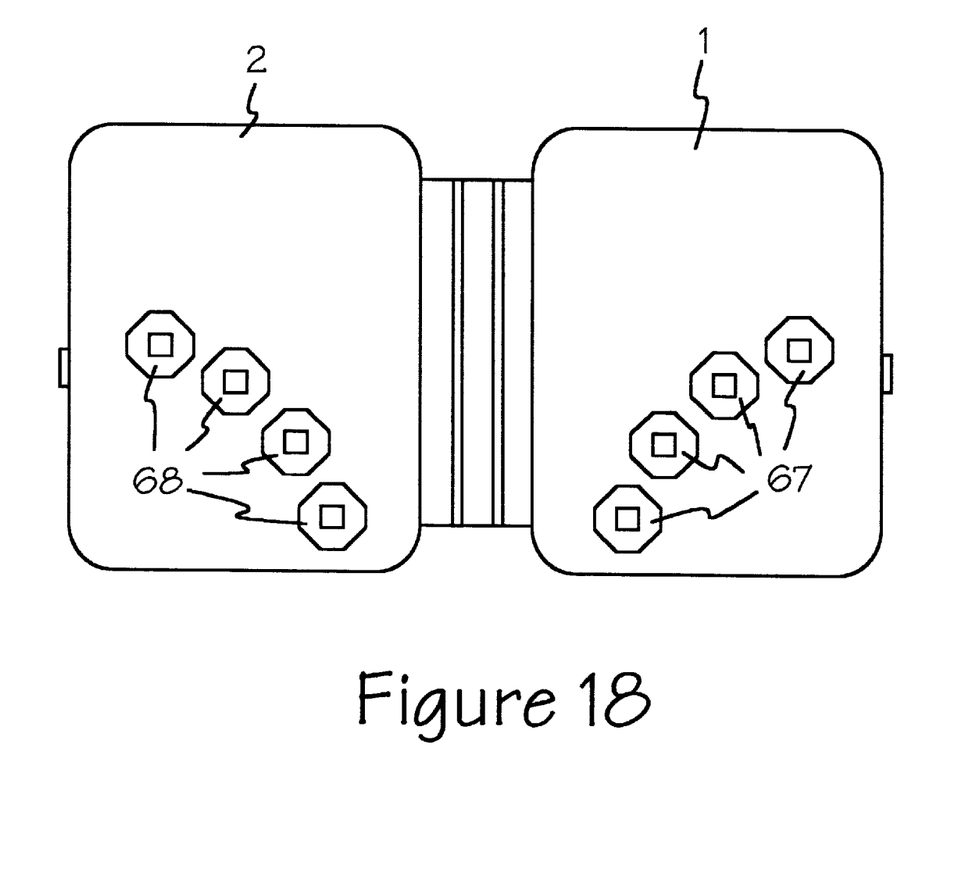
FIG. 18 is a back view of a sixth embodiment of the present invention in its open configuration.

Referring to FIG. 18, a sixth embodiment of the present invention is identical to the second embodiment, described above, except for the keyboard arrangement. The keyboard comprises two groups of four eight-way tilt switches 67,68. The tilt-switches 67,68 are arranged in rows on curves around lower corner regions (as viewed in FIG. 18) of the first and second body portions 1,2. Each switch 67,68 can be tilted in eight directions each of which causes a connection, representing a different character, to be made. Thus, with eight such switches 64 different characters can be input by a user. Eight-way tilt switches are known from video game consoles.

In use, an apparatus, according to the present invention, is held in the manner of an open book so that the display is visible. The keyboard keys are arranged such that they can be operated by the user's fingers when the apparatus is being held in this manner.

In the foregoing, apparatus according to the present invention has been described with rectangular displays. It will be appreciated that displays of other shapes can be used. Likewise, apparatus, embodying the present invention, need not be rectangular.

It will be appreciated that apparatus according to the present invention may include any of the various user input devices, e.g. joysticks, pens etc. Additionally, various data storage devices such as floppy disk drives, hard disk drives, CD-ROM drives and ic or memory cards may be used in an apparatus according to the present invention, either individually or in combination.

Solar panels may be provided in addition to or in place of the batteries mentioned in the above description.

What is claimed is:

1. A portable electronic apparatus comprising:
   substantially rectangular, planar first and second body portions hinged together such that the apparatus can be opened and closed in the manner of a book;
   a display panel, and
   a user input means for generating commands for controlling the contents that are displayed on said display,
   wherein
      the display panel and the user input means are disposed back-to-back relative to each other on opposite sides of the body portion,
      the user input means comprises a plurality of manually operable elements arranged in at least one row, each row being on a respective curve that, when the apparatus is oriented for normal use, encloses a bottom corner region of the body,
      the display panel being located at and extending over the inside faces of both portions, and
      the user input means being located at an outside face of one of said portions.

2. An apparatus according to claim 1, wherein the display panel comprises first and second display elements, the display elements being movable, when the apparatus is in its open configuration, between spaced and mutually abutting configurations.

3. An apparatus according to claim 1, wherein the display panel comprises a single flexible display structure.

4. An apparatus according to claim 1, wherein the display panel comprises a light emitting polymer display device.

5. An apparatus according to claim 1, wherein the operable elements comprise keys of a keyboard means.

6. An apparatus according to claim 1, wherein the keyboard means comprises a membrane keyboard.

7. An apparatus according to claim 1, wherein the user input means is distributed between said portions.

8. An apparatus according to claim 1, wherein the operable elements comprise a plurality of keys mounted to a panel, the panel being pivotable between a first position substantially flat with respect to a said body portion and a second position angled away therefrom.

9. An apparatus according to claim 8, wherein said panel is arranged to pivot about an axis adjacent to the lower edge of said portion.

10. A portable electronic apparatus comprising first and second body portions and a hinge joining the first and second body portions together such that the apparatus can be opened and closed in the manner of a book, and a display, the display being configured to extend over the inside faces of and between said portions to form a single viewing area.

11. An apparatus according to claim 10, wherein the display comprises first and second planar display panels, the display panels being movable, when the apparatus is in its open configuration, between spaced and mutually abutting configurations.

12. An apparatus according to claim 10, wherein the display comprises a single flexible display structure.

13. An apparatus according to claim 10, wherein the display comprises a light emitting polymer display device.

* * * * *